Dec. 20, 1966  F. E. GRATE  3,292,953
DUCT FITTINGS CONNECTING MEANS
Filed May 5, 1964  4 Sheets-Sheet 1
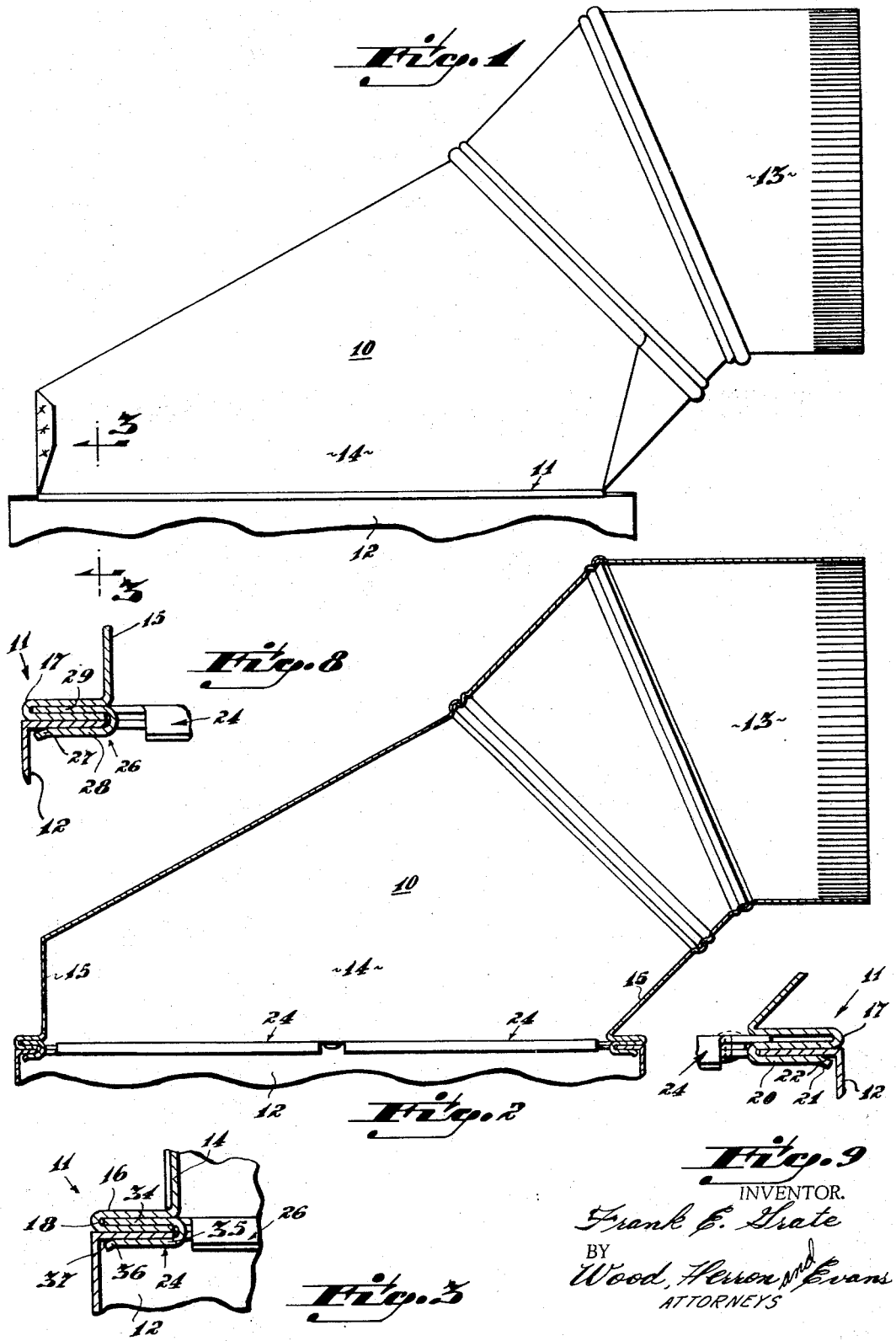
INVENTOR.
Frank E. Grate
BY
Wood, Herron and Evans
ATTORNEYS Dec. 20, 1966  F. E. GRATE  3,292,953
DUCT FITTINGS CONNECTING MEANS
Filed May 5, 1964  4 Sheets-Sheet 2
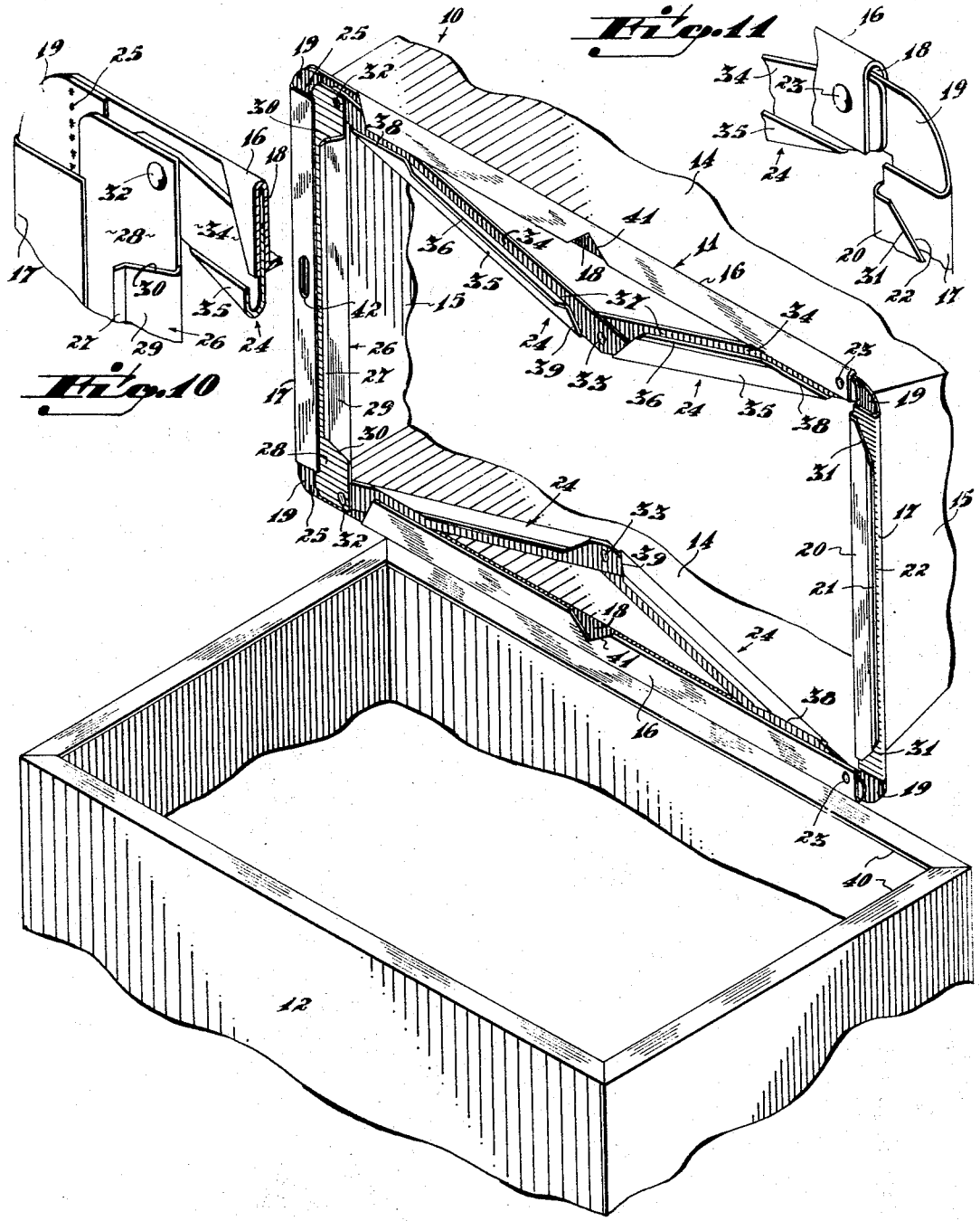
INVENTOR.
Frank E. Grate
BY
Wood, Herron & Evans
ATTORNEYS Dec. 20, 1966  F. E. GRATE  3,292,953
DUCT FITTINGS CONNECTING MEANS
Filed May 5, 1964  4 Sheets-Sheet 3
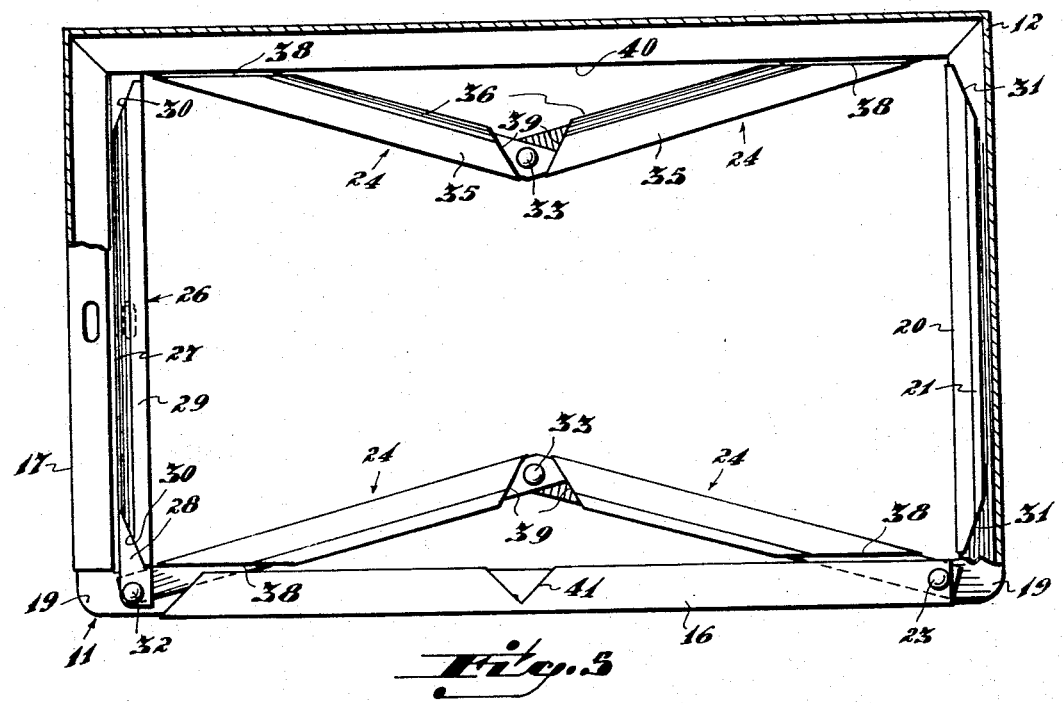
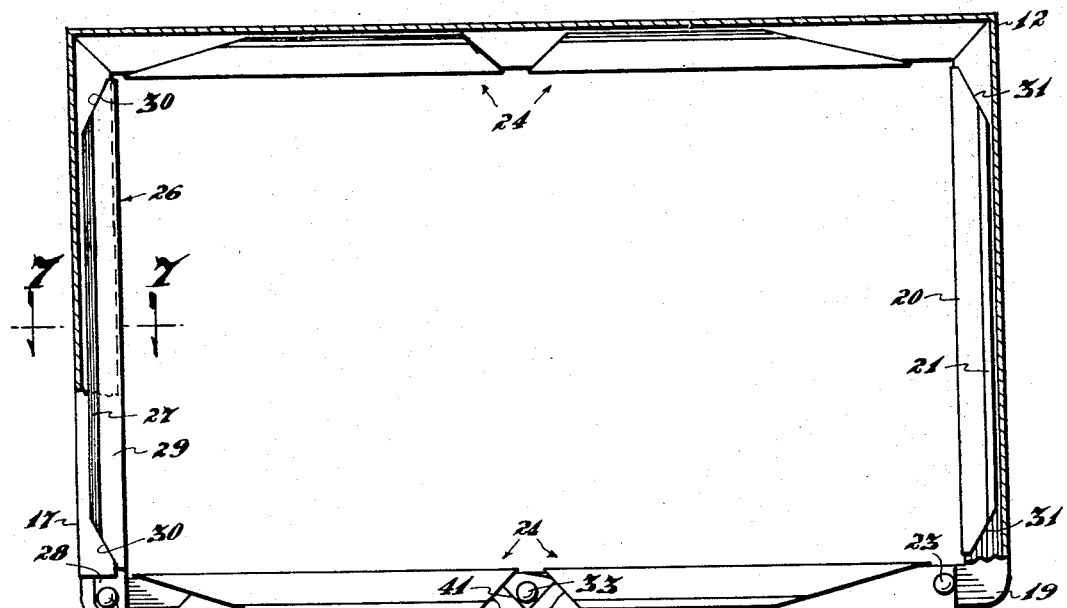
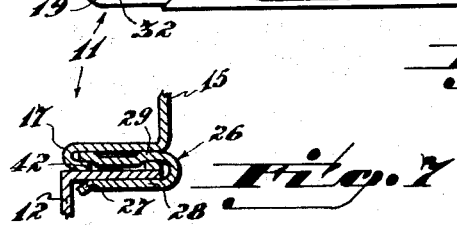
INVENTOR.
Frank E. Grate
BY
Wood, Herron & Evans
ATTORNEYS

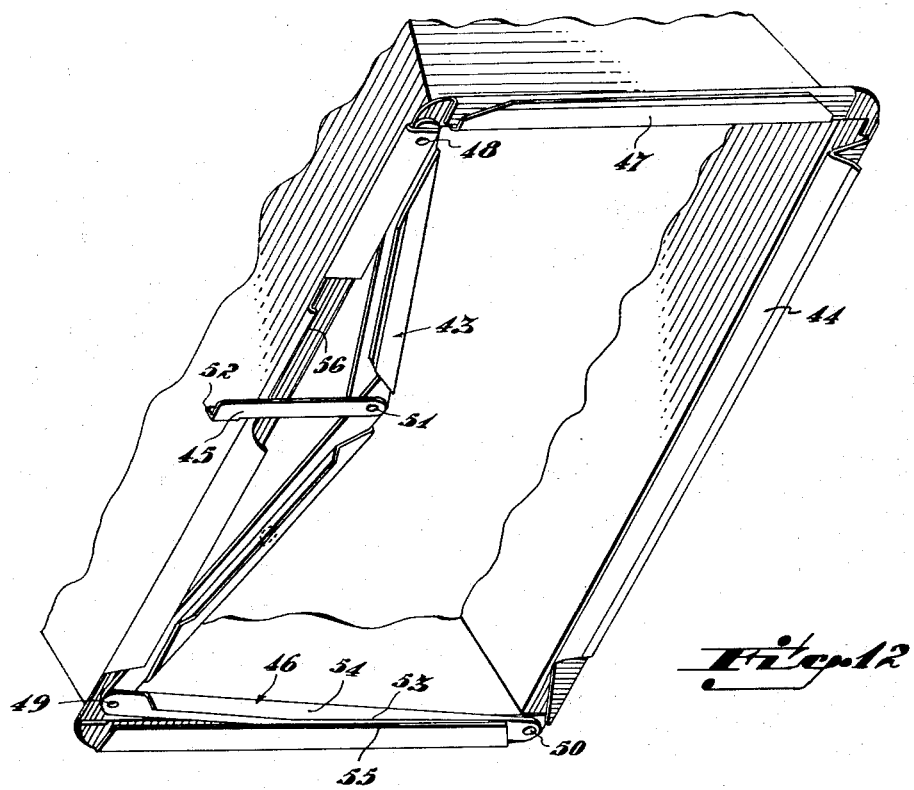
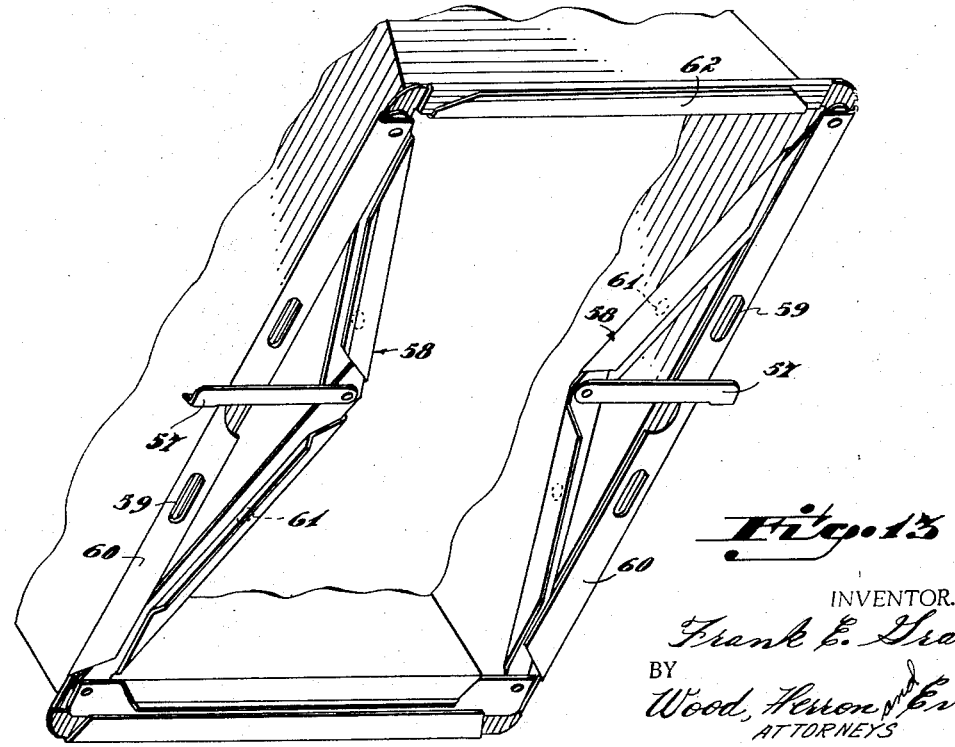

United States Patent Office 3,292,953
Patented Dec. 20, 1966

3,292,953
DUCT FITTINGS CONNECTING MEANS
Frank E. Grate, Cincinnati, Ohio, assignor to The Williamson Company, Cincinnati, Ohio, a corporation of Ohio
Filed May 5, 1964, Ser. No. 365,064
3 Claims. (Cl. 285—189)

This invention relates to sheet metal fittings of the type used in the ductwork of heating, ventilating and air conditioning systems. In such systems air is conveyed through sheet metal ducts leading from a central source such as a plenum chamber. These systems usually include main ducts and branch lines, the main ducts being rectangular in cross section with the branch lines being circular. The present invention is addressed particularly to take-off fittings by which main ducts are connected to plenum chambers and by which branch lines are connected to main ducts, the primary objective being to provide improved means for making these connections.

The invention is limited to connections made at rectangular openings in the walls of ducts and plenum chambers, but it is in no way limited to a particular type of fitting, being applicable to elbows, reducers and others as will be apparent.

In United States Patent No. 2,963,783, owned by the assignor of this invention, there is disclosed a base flange for sheet metal take-off fittings that readily may be associated with a plenum chamber wall or panel section of a duct in a substantially air-tight manner, whereby apertures or crevices through which air might otherwise escape are eliminated. However, a fitting of that disclosure is adapted to be fastened in place at an opening by means of tabs extending beyond the base flange which tabs, after placement of the fitting, are adapted to be bent against the inside surface of the conduit wall surrounding the opening. The bending over of these tabs is a time consuming job and unless care is exercised, the base flange is not seated properly and air leaks are created between the flange and the associated conduit wall. By contrast, the present invention reduces the time for making the connection to a matter of moments and it insures that the base flange is seated snugly, thereby guaranteeing the integrity of the connection.

Other objectives and advantages of the invention will be readily apparent to those skilled in the art from the following detailed description of the drawings in which:

FIGURE 1 is a side elevational view of a take-off fitting incorporating the connecting means of this invention.

FIGURE 2 is a cross-sectional view through the fitting of FIGURE 1.

FIGURE 3 is an enlarged fragmentary cross-sectional view taken on the line 3—3 of FIGURE 1.

FIGURE 4 is a perspective view illustrating a part of a conduit having a rectangular opening therein and a part of a fitting incorporating the connecting means of this invention.

FIGURE 5 is an elevational view illustrating the connecting means in the process of being engaged with a portion of a conduit of the type illlustrated in FIGURE 4 as seen from the inside of the conduit. In this view, some of the parts are broken away for illustration purposes.

FIGURE 6 is a view similar to FIGURE 5 showing the connecting means secured.

FIGURE 7 is an enlarged fragmentary cross-sectional view taken on the line 7—7 of FIGURE 6.

FIGURE 8 is an enlarged fragmentary cross-sectional view showing the manner in which the various parts overlap in that area of FIGURE 2 that is at the lower left.

FIGURE 9 is a view similar to FIGURE 8 of that portion of FIGURE 2 that is at the lower right.

FIGURE 10 is an enlarged fragmentary perspective view of the upper left corner of the fitting as it appears in FIGURE 4.

FIGURE 11 is a view similar to FIGURE 10 of the upper right hand corner of the fitting as it appears in FIGURE 4.

FIGURE 12 is a fragmentary perspective view similar to that shown in the upper portion of FIGURE 4 illustrating a modified form of the invention.

FIGURE 13 is a view similar to FIGURE 12 showing an additional modification.

For the purposes of this disclosure, a take-off fitting illustrated at 10 is utilized, this take-off fitting having a rectangular base 11 adapted to be attached to the wall of an air conduit 12. The outer end 13 of the fitting is circular in cross section, as would be the case for connecting a branch line to the conduit 12. The configuration, construction and shape of the fitting 10 in the area above base 11 is of little moment insofar as this invention is concerned and attention is now directed to the base portion.

As disclosed in United States Patent No. 2,963,783, the lower edges of the side walls 14—14 of the fitting and the lower edges of the end walls 15—15 of the fitting are turned outwardly at right angles and then back upon themselves to provide base flanges 16—16 at the sides and base flanges 17—17 at the ends. The base flanges are thus channel-shaped with the channels opening inwardly. The walls of the channel-shaped base flanges 16—16 at the sides of the fitting are spaced from one another as is best illustrated in FIGURE 4 to provide a slot 18 in each instance, this slot throughout its length being slightly wider than the sheet metal employed for the fitting.

As illustrated in Patent 2,963,783, it is preferred that right angular tabs 19—19 be provided at the ends of the base channel 17 in each instance. It is to be noted that base channel 17 at the right in FIGURE 4 is doubled upon itself a second time to provide a fixed, outwardly facing channel 20, the free edge of which is configurated to provide a lip 21 so that a flared throat 22 is provided at the entrance into the slot defined by the walls of the channel 20. At this end of the fitting, the right angular tabs 19—19 turn to the left as shown in FIGURE 4 and they are engaged within the ends of the slot 18 of the base flanges 16—16 at the sides of the fitting. See FIGURE 11. In this case, the tabs are secured by rivets 23—23, these rivets passing through the two walls of the channel-shaped base flanges 16—16 and through a hole provided within each of the tabs 19—19. These two rivets also provide pivots for the right ends (as shown in FIGURE 4) of a pair of toggle channels designated generally by the numerals 24—24. At the opposite end, shown at the left in FIGURE 4, the right angular tabs 19—19 are merely tack welded, as illustrated at 25—25 to the base flanges 16—16. See FIGURE 10. The reason for the tack weld instead of a rivet will be explained.

There is shown at the left in FIGURE 4, a shiftable locking channel designated generally by the numeral 26. This channel faces outwardly and its free edge is lipped as at 27 to provide a throat similar to the one provided at 22 on the fixed channel 20 at the opposite end of the fitting. The inner wall, designated 28, of the slidable channel 26, is wider than the outer wall, which is designated 29, so that at least an edge of the wall 28 remains within the slot of the inwardly facing channel of the adjacent base flange 17. It is to be noted at this time that the outer wall 29 of the slidable channel 26 is not as long as the inner wall, the ends of the outer wall being cut off as at 30—30. The same thing is true for the fixed channel 20. The ends are cut off as at 31—31. The adjacent ends of the toggle channels 24—24 are riveted as at 32—32 to the opposite ends of the inner wall 28 of shiftable channel 26.

Each toggle channel 24 comprises two parts that are hinged together by means such as rivets 33—33. Each part of each toggle channel 24 comprises an outwardly facing channel having an inner wall 34 and an outer wall 35, with the outer wall being lipped as at 36 to provide a flared throat 37. The opposing ends of each of the outer walls 35 of the parts of each toggle channel are cut at an angle as shown at 38 for clearance purposes as will be explained. The adjacent ends of the outer walls 35 of each toggle channel are cut off as at 39—39 for clearance purposes, in this instance, to provide clearance for the rivets 33—33 that provide the hinges for the toggle channels.

As shown in FIGURES 4 and 5, when the toggle channels are broken inwardly, the shiftable channel at the left end is in a retracted, inner position such that the outer wall 29 of the channel 26 is free of the adjacent base flange 17. In this condition, it is to be noted that the cut off ends 38 of the toggle channels are in spaced parallel relation to the adjacent base flanges 16—16 at the sides so that the fitting may be engaged in a rectangular opening of the type illustrated at 40 in a side of an air conduit such as that illustrated at 12. By first slipping the fixed channel 20 onto the sheet metal of the plenum-chamber adjacent one side of the opening, the other base flanges may be pressed against the conduit wall surrounding the other three sides of the opening. To lock the fitting in place the toggle arms then may be straightened out, which extends the shiftable channel 26 such that it engages the wall of the plenum chamber adjacent the opposite end of opening 40. At the same time, the toggle channels engage the wall of the plenum chamber along the opposite sides of the opening so that all four sides of the fitting are locked to all four edges of the opening. The lips on the channels 20, 26, and those on the toggle channels, insure that the edges of the conduit defining the opening are engaged, and due to the flaring nature of the various channels involved, there is a camming action that pulls the base flanges of the fitting into snug engagement with the sides of the opening guaranteeing a tight fit, and one that is little likely to permit air leakage. It is noted here that the tack welding 25 used at the corners adjacent the shiftable channel 26 offers no obstruction to the sliding movement of the shiftable channel.

In order to provide clearance for the hinge rivets 33—33 when the toggle channels are straightened, a notch 41 is provided in each base channel 16, and in order to provide means for locking the toggle channels in their straightened condition, a locking detent such as that shown at 42 may be provided, this detent cooperating with a wall of the shiftable channel 26 when it is in its fully extended position. See FIGURE 7. Similar locking detents may be provided for locking the toggle channels to the base flanges at the sides of the fitting if it is so desired.

It may be seen therefore, that the connecting means of this invention is exceedingly easy to operate. The installer need only make sure that the toggle channels are broken inwardly sufficiently far so that the toggle channels and the outer wall 29 of the shiftable channel clear the edges of opening 40. Once the fixed channel 20 at the one end of the fitting is engaged and the fitting seated, the installer need only straighten the toggle channels and the fitting is locked securely in place.

In FIGURE 12, there is showing a fitting base that is modified in several respects over the embodiment shown in FIGURES 1-11. Only one toggle channel 43 is employed along one of the sides of the base. A fixed base channel 44 is provided at the side opposite the toggle channel and means such as a lever 45 is employed to make it possible to bring the toggle channel 43 into locking engagement with the adjacent base flange. Additionally, in this instance, a modified shiftable channel 46 is employed.

More specifically, the end of the base opposite the shiftable channel 46 has a fixed channel 47 that is identical to fixed channel 20 of the embodiment of FIGURES 1-11. The fixed channel 44 to the right of the fitting in FIGURE 12 is substantially identical to fixed channel 47 although it is longer as shown. One end of the toggle channel 43 is riveted as at 48 to the base flange adjacent to the left end of fixed channel 47 as it appears in FIGURE 12. The opposite end of the toggle channel 43 is riveted as at 49 to an end of shiftable channel 46. The opposite end of the shiftable channel is riveted as at 50 to the base flange. Rivets 48, 49 and 50 provide pivot points.

Lever 45 is pivotally riveted as at 51 to the joint between the two parts of toggle channel 43. The lever is made of thin sheet metal and it extends over the adjacent base flange and it has a tab 52 turned up from one side of its outer end. It may be seen that when the lever 45 is pulled outwardly, the toggle channel 43 is straightened out so that it is coextensive with the adjacent base flange. The straightening of the toggle member causes the left end of the shiftable channel 46 to move into an extended position in which it is in locking relation with the adjacent base flange, the shiftable channel swinging about rivet 50 during this movement.

When the shiftable channel 46 is in the retracted position shown in FIGURE 12, a tapered section 53 of its outer wall 54 is in spaced parallel relation to the inner edge 55 of the adjacent base flange clearing it. When the toggle channel 43 is pulled into locking position by lever 45, the lever then may be swung about pivot 51 and placed in a position in which it resides between the adjacent base flange and the part of the toggle channel 43 that is between pivot 51 and the rivet 48. Clearance may be provided for the extra thickness of material in the lever by cutting out the outer wall of the adjacent base flange as is best seen at 56 in FIGURE 12.

To install this modified form of the fitting, toggle channel 43 is broken into the position shown in FIGURE 12. The two fixed channels 44 and 47 are then engaged over the wall of a conduit surrounding a rectangular opening of appropriate size. At this time, the tapered portion 53 of shiftable channel 46 provides clearance. The fitting then may be locked in place from the outside by pulling lever 45 outwardly, this extending the shiftable lever into locking relation with the adjacent base flange and bringing the two parts of the toggle channel 43 into locking relation with the base flange adjacent them. Lever 45 then may be swung into a position immediately adjacent the side of the base flange with which it is associated.

FIGURE 13 shows the use of two levers 57—57 which are identical to the one designated 45 in FIGURE 12, these levers being applied to a fitting having two toggle channels 58—58 as in the case of the form of the invention shown in FIGURES 1-11. This figure also illustrates the use of slots 59 in side base flanges 60—60, these slots cooperatnig with dimples 61 formed in the side walls of the toggle channels to provide a friction lock when the toggle channels are in locked condition. In this instance, installation is simply a matter of engaging the fixed channel identified at 62 and then pulling the two levers 57—57 outwardly from outside the fitting, and then swinging them over against the outer edges of the base flanges 60—60 with which they are associated.

Having described my invention, I claim:

1. Means to connect the rectangular base of a take-off fitting to the wall of an air conduit or the like surrounding a rectangular opening in said wall, said base having base flanges at the sides and ends thereof that are channel-shaped and that open inwardly, said means comprising a fixed channel on the base flange at one end of said base that opens outwardly and embraces said conduit wall at a first side of said opening therein, a shiftable channel adjacent the base flange at the opposite end of said base that opens outwardly, toggle channels at each of the sides of said base that open outwardly, means pivotally connecting first ends of said toggle channels to said base adjacent the respective opposite ends of said fixed channel, means pivotally attaching the ends of said toggle channels opposite said first ends to the respective opposite ends of said shiftable channel, and each of said toggle channels being hinged adjacent their centers and movable between angulated positions in which their mid sections are spaced inwardly from said side base flanges and positions in which they are straight and coextensive with said side base flanges and embracing said conduit wall at the second and third sides of said opening therein that are opposite one another, the movement of said toggle channels between said positions shifting said shiftable channel from a position in which it is retracted inwardly away from said adjacent base flange and one in which it is coextensive with said adjacent base flange and embracing said conduit wall at the fourth side of said opening therein.

2. Means to connect the rectangular base of a take-off fitting to the wall of an air conduit or the like surrounding a rectangular opening in said wall, said base having base flanges at the sides and ends thereof that are channel-shaped and that open inwardly, said means comprising a fixed channel on the base flange at one end of said base that opens outwardly, said fixed channel embracing said conduit wall at one end of said rectangular opening, a shiftable channel adjacent the base flange at the opposite end of said base that opens outwardly, toggle channels at each of the sides of said base that open outwardly, means pivotally connecting first ends of said toggle channels to said base adjacent the respective opposite ends of said fixed channel, means pivotally attaching the ends of said toggle channels opposite said first ends to the respective opposite ends of said shiftable channel, and each of said toggle channels being hinged adjacent their centers and movable between angulated positions in which their mid-sections are spaced inwardly from said side base flanges and positions in which they are straight and coextensive with said side base flanges, in the last named positions said toggle channels embracing said conduit wall at the sides of said rectangular opening, the movement of said toggle channels shifting said shiftable channel between a position in which it is retracted inwardly away from said adjacent base flange and one in which it is coextensive with said adjacent base flange and embracing the wall of said opening at the second end thereof.

3. Means to connect the rectangular base of a take-off fitting to the wall of an air conduit or the like surrounding a rectangular opening in said wall, said means comprising a fixed channel on said base at a first end thereof that opens outwardly and embracing said conduit wall at a first side of said opening therein, a shiftable channel that opens outwardly adjacent the base at a second end thereof, at least one toggle channel at one side of said base that opens outwardly, means pivotally connecting a first end of said toggle channel to said base adjacent one end of said fixed channel, means pivotally attaching the end of said toggle channel opposite said first end to an end of said shiftable channel, said toggle channel being hinged adjacent its center and movable between an angulated position in which its mid-section is spaced inwardly from said one side of said base and a position in which said toggle channel is straight and coextensive with said one side of said base and embracing said conduit wall at a second side of said opening therein, the movement of said toggle channel between said positions shifting said shiftable channel from a position in which it is retracted inwardly away from the base at said second end thereof and one in which it is coextensive with said second end thereof and embracing said conduit wall at a third side of said opening therein.

References Cited by the Examiner

UNITED STATES PATENTS

| | | | |
|---|---|---|---|
| 739,783 | 9/1903 | Harder | 248—99 |
| 2,340,540 | 2/1944 | Lange | 248—99 |
| 2,950,131 | 8/1960 | Hennen | 285—424 X |
| 2,965,397 | 12/1960 | Vanden Berg | 285—424 X |
| 3,052,490 | 9/1962 | Greenlaw | 285—424 X |

THOMAS F. CALLAGHAN, *Primary Examiner.*

T. A. LISLE, *Assistant Examiner.*